US011875130B1

(12) United States Patent
Bosnjakovic et al.

(10) Patent No.: US 11,875,130 B1
(45) Date of Patent: Jan. 16, 2024

(54) CONFIDENCE GENERATION FOR MANAGING A GENERATIVE ARTIFICIAL INTELLIGENCE MODEL

(71) Applicant: Intuit Inc., Mountain View, CA (US)

(72) Inventors: Dusan Bosnjakovic, Los Angeles, CA (US); Anshuman Sahu, Los Gatos, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/226,020

(22) Filed: Jul. 25, 2023

(51) Int. Cl.
*G06F 40/40* (2020.01)

(52) U.S. Cl.
CPC .................................. *G06F 40/40* (2020.01)

(58) Field of Classification Search
CPC .. G06F 40/30; G06F 16/3329; G06F 16/3344; G06F 16/24522; G06F 40/216; G06F 40/289; G06F 16/90332; G06F 40/284; G06F 16/24578; G06F 40/295; G06F 40/35; G06F 40/205; G06F 16/9535; G06F 40/247; G06F 40/237; G06F 40/20; G06F 40/40; G06F 40/279; G06F 16/338; G06F 16/243; G06F 16/285; G06F 40/42; G06F 40/268; G06F 40/211; G06F 40/44; G06F 40/56; G06F 16/334; G06F 16/951; G06F 40/169; G06F 16/367; G06F 16/9024; G06F 16/93; G06F 40/58; G06F 16/335; G06F 16/248; G06F 16/36; G06F 16/24575; G06F 16/3347; G06F 16/353; G06F 18/22; G06F 40/253; G06F 16/3334; G06F 16/345; G06F 16/90335; G06F 16/355; G06F 40/263; G06F 17/16; G06F 16/35; G06F 40/166; G06F 16/00; G06F 16/313; G06F 40/151; G06F 40/242; G06F 16/2455; G06F 9/453; G06F 11/3668; G06F 16/3322; G06F 16/3349; G06F 16/909; G06F 40/131; G06F 40/137; G06F 7/08; G06F 16/23; G06F 16/288; G06F 16/328; G06F 16/3331; G06F 16/9035; G06F 16/9538; G06F 18/24; G06F 3/0481; G06F 40/232; G06F 11/3664; G06F 11/3672; G06F 11/3684; G06F 16/215; G06F 16/22; G06F 16/2477; G06F 16/3326;
(Continued)

(56) References Cited

U.S. PATENT DOCUMENTS

7,966,187 B1 * 6/2011 Pettay ..................... G10L 15/26
704/270.1
9,497,327 B2 * 11/2016 Madhavapeddi ....... G10L 15/26
(Continued)

*Primary Examiner* — Abdelali Serrou
(74) *Attorney, Agent, or Firm* — Paradice & Li LLP (57) ABSTRACT

Systems and methods are disclosed for managing a generative artificial intelligence (AI) model. Managing the generative AI model may include training or tuning the generative AI model before use or managing the operation of the generative AI model during use. Training or tuning a generative AI model typically requires manual review of outputs from the model based on the queries provided to the model to reduce hallucinations generated by the generative AI model. Once the model is in use, though, hallucinations still occur. Use of a confidence (whose generation is described herein) to train or tune the generative AI model and/or manage operation of the model reduces hallucinations, and thus improves performance, of the generative AI model.

12 Claims, 4 Drawing Sheets

(58) Field of Classification Search
CPC ............ G06F 16/3328; G06F 16/3346; G06F 16/9032; G06F 16/9574; G06F 18/253; G06F 2212/60; G06F 30/398; G06F 40/14; G06F 8/10; G06F 8/43; G06F 16/2423; G06F 16/24573; G06F 16/2465; G06F 16/34; G06F 16/5838; G06F 17/00; G06F 17/18; G06F 21/32; G06F 21/6245; G06F 3/0482; G06F 3/167; G06F 40/49; G06F 12/0891; G06F 12/0895; G06F 12/12; G06F 16/2365; G06F 16/24564; G06F 16/24569; G06F 16/382; G06F 16/5866; G06F 16/635; G06F 16/9537; G06F 18/214; G06F 18/2148; G06F 18/2411; G06F 18/2414; G06F 21/6254; G06F 2212/601; G06F 2212/604; G06F 40/10; G06F 40/45; G06F 16/2452; G06F 16/2471; G06F 16/29; G06F 16/322; G06F 16/3338; G06F 16/9027; G06F 16/9038; G06F 16/907; G06F 16/958; G06F 18/21; G06F 18/2178; G06F 18/40; G06F 21/31; G06F 21/45; G06F 21/602; G06F 2203/011; G06F 2221/2131; G06F 3/165; G06F 40/194; G06F 40/55; G06F 11/302; G06F 11/3079; G06F 11/3688; G06F 12/0875; G06F 12/0888; G06F 16/128; G06F 16/20; G06F 16/24; G06F 16/2428; G06F 16/244; G06F 16/24542; G06F 16/24552; G06F 16/2457; G06F 16/252; G06F 16/256; G06F 16/30; G06F 16/325; G06F 16/3323; G06F 16/3325; G06F 16/358; G06F 16/447; G06F 16/48; G06F 16/489; G06F 16/532; G06F 16/7834; G06F 16/901; G06F 16/90344; G06F 16/908; G06F 16/9558; G06F 16/986; G06F 18/211; G06F 18/2155; G06F 18/217; G06F 18/2193; G06F 18/2321; G06F 18/23213; G06F 18/295; G06F 18/41; G06F 21/1015; G06F 21/105; G06F 21/57; G06F 21/6218; G06F 2212/1024; G06F 2218/08; G06F 2221/034; G06F 2221/2141; G06F 3/048; G06F 3/0484; G06F 40/00; G06F 40/12; G06F 40/134; G06F 40/186; G06F 7/026; G06F 7/24; G06F 8/73; G06F 9/451; G06F 11/00; G06F 11/30; G06F 11/3409; G06F 16/14; G06F 16/2237; G06F 16/2379; G06F 16/24558; G06F 16/27; G06F 16/31; G06F 16/337; G06F 16/374; G06F 16/535; G06F 16/538; G06F 16/583; G06F 16/5854; G06F 16/683; G06F 16/838; G06F 16/90; G06F 16/95; G06F 16/953; G06F 16/9536; G06F 18/10; G06F 18/2113; G06F 18/2135; G06F 18/23; G06F 18/2413; G06F 18/24147; G06F 18/2431; G06F 18/24765; G06F 18/251; G06F 18/254; G06F 18/259; G06F 21/52; G06F 21/60; G06F 2216/03; G06F 2218/02; G06F 2218/12; G06F 3/04845; G06F 40/117; G06F 40/126; G06F 40/226; G06F 40/51; G06F 40/53; G06F 9/54; G06F 9/542; G06F 9/547; G10L 15/22; G10L 15/183; G10L 15/30; G10L 15/18; G10L 15/142; G10L 18/1815; G10L 15/285; G10L 2015/223; G10L 15/1822; G10L 15/005; G10L 17/22; G10L 15/08; G10L 2015/088; G10L 15/19; G10L 15/26; G10L 25/51; G10L 15/32; G10L 15/197; G10L 15/24; G10L 15/063; G10L 2015/225; G10L 13/027; G10L 13/02; G10L 15/07; G10L 15/16; G10L 2015/227; G10L 25/63; G10L 13/00; G10L 13/08; G10L 15/02; G10L 2015/0631; G10L 2015/228; G10L 25/57; G10L 15/00; G10L 15/20; G10L 17/00; G10L 17/24; G10L 17/26; G10L 2015/0638; G10L 21/00
See application file for complete search history.

(56) References Cited

U.S. PATENT DOCUMENTS

| | | | |
|---|---|---|---|
| 10,534,827 B2 * | 1/2020 | Spears | G06F 40/10 |
| 10,997,224 B2 * | 5/2021 | Pidathala | G06F 16/3344 |
| 11,429,834 B1 * | 8/2022 | Xue | G06F 40/284 |
| 11,687,734 B2 * | 6/2023 | Harper | G06F 40/295 704/9 |
| 2012/0041959 A1 * | 2/2012 | Weissman | G06F 16/36 707/E17.014 |
| 2012/0308206 A1 * | 12/2012 | Kulas | G06F 40/211 386/E5.009 |
| 2017/0032394 A1 * | 2/2017 | Stevens | G06F 40/211 |
| 2019/0303796 A1 * | 10/2019 | Balasubramanian | G06F 40/30 |
| 2022/0392437 A1 * | 12/2022 | Moschella | G06F 3/0482 |
| 2023/0133392 A1 * | 5/2023 | Wang | G06F 40/211 704/9 |

* cited by examiner

```
┌─────────────────────────────────────────────────────────────────────┐
│ Generate, by the NLP model, a first similarity metric between the   │
│ question and the content. 402                                        │
└─────────────────────────────────────────────────────────────────────┘
                                  ↓
┌─────────────────────────────────────────────────────────────────────┐
│ Compare the first similarity metric to a first similarity threshold │
│ to generate a first similarity indication. 404                       │
└─────────────────────────────────────────────────────────────────────┘
                                  ↓
┌─────────────────────────────────────────────────────────────────────┐
│ Generate, by the NLP model, a second similarity metric between the  │
│ answer and the content. 406                                          │
└─────────────────────────────────────────────────────────────────────┘
                                  ↓
┌─────────────────────────────────────────────────────────────────────┐
│ Compare the second similarity metric to a second similarity         │
│ threshold to generate a second similarity indication. 408            │
└─────────────────────────────────────────────────────────────────────┘
                                  ↓
┌─────────────────────────────────────────────────────────────────────┐
│ Generate, by a sensitivity model, a first sensitivity indication    │
│ based on the answer. 410                                             │
└─────────────────────────────────────────────────────────────────────┘
                                  ↓
┌─────────────────────────────────────────────────────────────────────┐
│ Generate, by the sensitivity model, a second sensitivity indication │
│ based on the question. 412                                           │
└─────────────────────────────────────────────────────────────────────┘
                                  ↓
┌─────────────────────────────────────────────────────────────────────┐
│ Combine the first similarity indication, the second similarity      │
│ indication, the first sensitivity indication, and the second        │
│ sensitivity indication to generate the confidence metric. 414        │
│ ┌─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐ │
│ │ Logically AND the first similarity indication, the second      │ │
│ │ similarity indication, the first sensitivity indication, and   │ │
│ │ the second sensitivity indication. 416                         │ │
│ └─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘ │
└─────────────────────────────────────────────────────────────────────┘
```

Figure 4

CONFIDENCE GENERATION FOR MANAGING A GENERATIVE ARTIFICIAL INTELLIGENCE MODEL

TECHNICAL FIELD

This disclosure relates generally to the management of a generative artificial intelligence model, including the generation of a confidence and managing the generative artificial intelligence model based on the confidence.

DESCRIPTION OF RELATED ART

A generative artificial intelligence (AI) model is a model that is trained to generate content based on prompts to the model. One popular generative AI model is ChatGPT® from OpenAI®. The ChatGPT model receives a user input requesting a text output from the model, and the ChatGPT model generates and outputs text based on the user input. While ChatGPT is one example generative AI model, various other generative AI models exist and are in development, such as InstructGPT, GPT-4, Google® Bard, and so on. One type of Generative AI model is a question and answer model, where the model is provided a question and the model generates a natural language answer to the question.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Systems and methods are disclosed for managing a generative artificial intelligence (AI) model. Managing the generative AI model may include training or tuning the generative AI model before use or managing the operation of the generative AI model during use. Training or tuning a generative AI model typically requires manual review of outputs from the model based on the queries provided to the model to reduce hallucinations and otherwise improve the outputs generated by the generative AI model. Once the model is in use, though, hallucinations and other undesired outputs may still occur. Use of a confidence (whose generation is described herein) to train or tune the generative AI model and/or manage operation of the model reduces hallucinations and other undesired outputs, thus improving performance of the generative AI model.

One innovative aspect of the subject matter described in this disclosure can be implemented as a computer-implemented method for managing a generative artificial intelligence (AI) model. The method includes receiving a question provided to a generative AI model and receiving an answer generated by the generative AI model based on the question provided to the generative AI model. The method further includes retrieving, by a content retrieval model, a content from a knowledge base based on the question. The method also includes providing the question, the answer, and the content to a natural language processing (NLP) model. The method further includes generating, by the NLP model, a first similarity metric between the question and the content and generating, by the NLP model, a second similarity metric between the answer and the content. The method also includes generating a confidence metric based on the first similarity metric and the second similarity metric and managing the generative AI model based on the confidence metric.

Another innovative aspect of the subject matter described in this disclosure can be implemented in a system for managing a generative AI model. An example system includes one or more processors and a memory storing instructions that, when executed by the one or more processors, cause the system to perform operations. The operations include receiving a question provided to a generative AI model and receiving an answer generated by the generative AI model based on the question provided to the generative AI model. The operations further include retrieving, by a content retrieval model, a content from a knowledge base based on the question. The operations also include providing the question, the answer, and the content to a natural language processing (NLP) model. The operations further include generating, by the NLP model, a first similarity metric between the question and the content and generating, by the NLP model, a second similarity metric between the answer and the content. The operations also include generating a confidence metric based on the first similarity metric and the second similarity metric and managing the generative AI model based on the confidence metric.

In some implementations, the system is configured to provide the answer and the question to a sensitivity model and generating, by the sensitivity model, a first sensitivity indication based on the answer and a second sensitivity indication based on the question. Generating the confidence metric may include comparing the first similarity metric to a first similarity threshold to generate a first similarity indication, comparing the second similarity metric to a second similarity threshold to generate a second similarity indication, and combining the first similarity indication, the second similarity indication, the first sensitivity indication, and the second sensitivity indication to generate the confidence metric. Combining the first similarity indication, the second similarity indication, the first sensitivity indication, and the second sensitivity indication may include logically ANDing the first similarity indication, the second similarity indication, the first sensitivity indication, and the second sensitivity indication.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

DETAILED DESCRIPTION

Implementations of the subject matter described in this disclosure may be used for managing a generative artificial intelligence (AI) model to reduce undesired outputs (such as hallucinations, irrelevant answers, or toxic language). The generative AI models referred to herein are a generative AI model configured to generate a natural language answer to a question provided to the model.

Generative AI model users struggle with such models generating hallucinations, in which the output by the model includes false statements represented as facts. In addition, generative AI model developers struggle with such models generating sensitive language in outputs (such as profanity or toxic language). To attempt to reduce hallucinations and sensitive language, developers and testers will spend weeks or months (or more) manually testing the model, reviewing the outputs for hallucinations and sensitive language, and adjusting the model during training (or fine-tuning). However, the generative AI model may still generate hallucinations or sensitive language. As such, there is a need for a system to automatically manage the generative AI model to prevent hallucinations or sensitive language from being provided to a user.

Various implementations of the subject matter disclosed herein provide one or more technical solutions to managing generative AI models. Managing the generative AI model may include one or more of: (i) training or fine-tuning (referred to herein simply as training) the generative AI model or (ii) managing the outputs generated by the generative AI model during use. To manage a generative AI model, a system is configured to generate a unique confidence metric, as described herein, and the system is configured to use the confidence metric to manage the generative AI model (such as in training of the generative AI model before use or to manage the outputs of the generative AI model during use).

Various aspects of the present disclosure provide a unique computing solution to a unique computing problem that did not exist prior to the creation of machine learning models, and in particular generative AI models. Implementation and use of machine learning technology (including generative AI and natural language processing) as described herein cannot be performed in the human mind, much less practically in the human mind, including the use of pen and paper. As such, implementations of the subject matter disclosed herein are not an abstract idea such as organizing human activity or a mental process that can be performed in the human mind.

In typical testing environments, one or more users manually compare answers from a generative AI model to the questions provided to the generative AI model. However, such comparison relies on the expertise of the users. For example, a user needs to be able to recognize false information in an answer to attempt to identify hallucinations. In addition, comparing the answer to the question does not highlight as to whether issues in the answer arise from the generative AI model itself after fine-tuning (such as the generative AI model generating hallucinations or sensitive language) or the knowledge base used to ground the generative AI model during tuning (such as the knowledge base including content that is sensitive or having incorrect information). As such, the confidence (referred to herein as a confidence metric) generated as described herein may be used to improve tuning of the generative AI model. In addition, once the generative AI model is in use, it may be desired to manage the outputs of the generative AI model so that sensitive language or hallucinations do not appear in the answers from the generative AI model to the end user. The confidence metric generated as described herein may be used to manage the generative AI model to prevent hallucinations and sensitive language from being provided to end user. Managing the generative AI model refers to one or both of training or fine-tuning (which is referred to simply as training) the generative AI model) or managing the outputs of the generative AI model after training and while in use. Managing the generative AI model is described herein as being based on a confidence metric generated as described herein.

Figure 1:
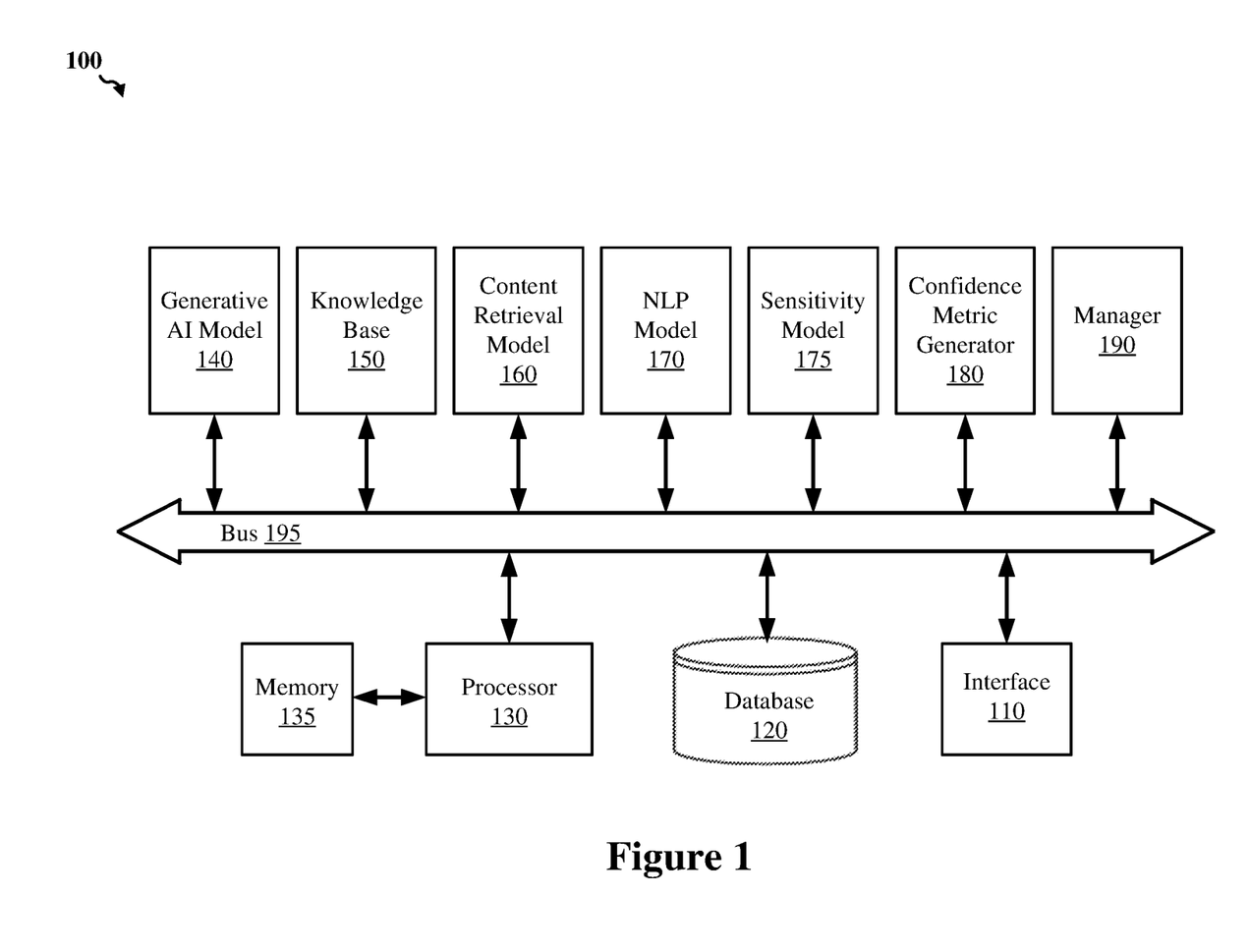
FIG. 1 shows an example system for managing a generative artificial intelligence (AI) model, according to some implementations.

FIG. 1 shows an example system 100 for managing a generative AI model, according to some implementations. The system 100 includes an interface 110, a database 120, a processor 130, a memory 135 coupled to the processor 130, a generative AI model 140, a knowledge base 150, a content retrieval model 160, a natural language processing (NLP) model 170, a sensitivity model 175, a confidence metric generator 180, and a manager 190. In some implementations, the various components of the system 100 may be interconnected by at least a data bus 195, as depicted in the example of FIG. 1. In other implementations, the various components of the system 100 may be interconnected using other suitable signal routing resources.

The interface 110 may be one or more input/output (110) interfaces to obtain inputs (questions) to the generative AI model, provide outputs (answers) from the generative AI model, provide one or more generated metrics about the generative AI model or other information to users or to other systems, or receive or provide inputs or outputs for continued operation of the system 100. An example interface may include a wired interface or wireless interface to the internet or other means to communicably couple with other devices. In some implementations, the interface 110 may include an interface with an ethernet cable or a wireless interface to a modem, which is used to communicate with an internet service provider (ISP) directing traffic to and from other devices (such as a system used by a developer, tester, or end user to use the system 100 including the generative AI model 140). For example, the generative AI model 140 (which is a pretrained or a tuned generative AI model) may be implemented by the system 100 for use by a tester or an end user (which may be referred to in general as a user), and a user may interface with the system 100 in order to use the generative AI model 140. For example, the system 100 may use the interface 110 to provide a prompt of a natural language digital assistant (similar to an AI chatbot) that leverages the generative AI model 140 to answer questions on a particular topic, product, or service. For example Intuit® Quickbooks® may include a digital assistant that acts like a chatbot to answer questions input into an input prompt by a user. As such, the interface 110 may be used to communicate with a user device for the user to interact with the digital assistant to ask a question and receive an answer. If the generative AI model 140 is being tested (such as during training or after training but before use), access to the system 100 to interact with a digital assistant for a tester may be in a digital sandbox implemented by the system 100. In this manner, the model 140 may be tested, with feedback given by the user via the interface 110. If the system 100 is local to a user (such as to an internal developer), the interface 110 may include a display, a speaker, a mouse, a keyboard, or other suitable input or output elements that allow interfacing with the user (such as to provide a prompt to receive questions from the user, provide outputs from the generative AI model, provide other information for tuning the generative AI model, receive feedback from the user, and so on).

The database 120 may store questions to the generative AI model, answers from the generative AI model, articles retrieved from the knowledge base 160 for questions to the generative AI model, hyperparameters of the generative AI model, confidence metrics and components of the confidence metrics generated for answers from the generative AI model, or other computer executable instructions or data for operation of the system 100. In some implementations, the database 120 may include a relational database capable of presenting information as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications, the generative AI model 140, the content retrieval model 160, the natural language processing (NLP) model 170, the sensitivity model 175, the confidence metric generator 180, and the manager 190. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications, the generative AI model 140, the content retrieval model 160, the natural language processing (NLP) model 170, the sensitivity model 175, the confidence metric generator 180, and the manager 190 that may be executed by the processor 130. The memory 135 may also store inputs, outputs, or other information associated with the components 140-190 of the system 100 or any other data for operation of the system 100.

The generative AI model 140 is the model to be managed by the system 100. Managing the generative AI model 140 may include managing the outputs of the generative AI model 140 (such as preventing the output being provided to a user) or training the generative AI model 140. If the generative AI model 140 is in use by end users, the generative AI model 140 may be a fine-tuned model grounded by the knowledge base 150. For example, the generative AI model 140 may be a bidirectional autoregressive transformer (BART) model, a Text-To-Text Transfer Transformer (T5) model, or another suitable generative AI model that is pretrained on a large language dataset and then fine-tuned on the knowledge base 150. In the example of Intuit Quickbooks, the knowledge base 150 may include content specific or related to Quickbooks or to the topic of accounting, and the generative AI model 140 may be the pretrained BART model (which is trained on a large corpus on general English content scraped from the internet) that is fine-tuned using (and thus grounded by) the Quickbooks specific knowledge base 150. If the generative AI model 140 is to be trained or is in training (such as to be fine-tuned or is being fine-tuned), the generative AI model 140 may be the generative AI model 140 before or during training or tuning (such as the pretrained BART model before fine-tuning).

In some implementations, the generative AI model 140 is to be used for a digital assistant to provide answers in natural language form to questions provided by users on specific topics encompassed by the knowledge base 150. For example, if the knowledge base 150 is specific to Quickbooks and a digital assistant is included in or otherwise for Quickbooks, the digital assistant is configured to receive the question from a Quickbooks user regarding the product, provide the question to the generative AI model 140, obtain the answer generated by the generative AI model 140, and provide the answer to the user (such as via an I/O window on a display for the user). As such, managing the generative AI model 140 may include managing operation of a digital assistant that incorporates the generative AI model 140.

The knowledge base 150 is a storage of digital content regarding a desired product or topic. As used herein, a knowledge base refers to the storage of digital content, which may be accessed to answer various user questions or may otherwise include institutional knowledge. The content in the knowledge base may be divided into units referred to as articles herein. Articles may include text from previously written web pages on various topics (such as help pages), or previously written answers (such as by client support or by a user community) to previously asked questions from users (such as from client support records or from user community records stored on one or more servers). For example, Intuit has a knowledge base for Quickbooks that includes articles specific to Quickbooks (such as how to use the product) or specific to topics related to Quickbooks (such as finance or accounting topics).

As such, the knowledge base 150 includes content that is more focused on specific topics as compared to the general data used to pretrain the generative AI model 140. For example, an English language based generative AI model may be trained using a huge data set of English language webpages from across the internet. A company to use the generative AI model may wish for the model to be tuned to answer questions for a specific company product or for a specific topic. As such, the knowledge base 150 includes content tailored to the product or topic on which the model is to be tuned. As noted above, an example knowledge base that may be used by Intuit is for Intuit Quickbooks, with the content including articles specific to operation of Quickbooks or related to accounting or other related topics. The knowledge base 150 may be sourced to include any suitable content, such as historical digital data stored by an entity (such as from a community page or client support records from the company tuning the model for a product) or from an external message board dedicated to the entity (such as for a specific product for which the model is to be tuned). In some implementations, the knowledge base 150 is the storage of articles searchable by an existing digital assistant based on received queries (such as via an input window for a user or via an API to the digital assistant). In some implementations, the knowledge base 150 is included in the database 120, with the articles of the knowledge base 150 being searchable and accessible. Through use of the knowledge base 150, the generative AI model 140 is grounded based on the knowledge base 150.

The knowledge base 150 may be searchable and accessed to retrieve articles stored in the knowledge base 150. For example, each article may be in hypertext markup language (HTML) format and include a meta tag indicating information regarding the article. A tokenizer and vectorizer may be used to identify the most used terms in order to generate the meta tag, or any other typical means to generate a meta tag may be used. A meta tag may also include other information regarding the article, such as date created, source, and so on. To note, the knowledge base 150 may be any suitable storage of the system 100. For example, the knowledge base 150 may be included in the database 120.

The content retrieval model 160 is to access the knowledge base 150 and retrieve content from the knowledge base 150. For example, the content retrieval model 160 is configured to search for and retrieve articles from the knowledge base 150 based on queries provided to the content retrieval model 160. In some implementations, an existing digital assistant that provides only articles as resources to help a user in response to a question may include a content retrieval model to retrieve articles based on the question. For example, an existing digital assistant for Intuit Quickbooks includes a digital assistant, which appears as a window in the program. A user can type in a question or topic into an input window of the digital assistant, and the digital assistant can use a content retrieval model to search for and obtain articles retrieved from a Quickbooks related knowledge base based on the words or phrases in the question or topic. In some implementations, the content retrieval model 160 is configured to identify the most relevant content (such as the most relevant article) from the knowledge base and retrieve the content (such as the article) from the knowledge base so that the content may be provided to the user via the digital assistant. For example, the digital assistant may generate links (such as Uniform Resource Links) to one or more relevant articles hosted and accessible (such as via the internet), and provide the links to the user. To identify the most relevant content, the content retrieval model analyzes the terms in the user's question to identify content including the same terms. The content retrieval model may also analyze other factors, such as usability of articles (such as ranking pages based on frequency of user access), expertise level of the article writer (such as whether the article is from client support or a community member), user location, and so on. The content retrieval model may be programmed the same as an internet search engine, except instead of searching the internet, the content retrieval model searches the knowledge base.

Referring back to the example of the knowledge base 150 storing articles including meta tags, the content retrieval model 160 may be configured to search the meta tags to find the most relevant article for a query provided. The process of searching the knowledge base 150 by the content retrieval model 160 may be similar to a search engine, such as the content retrieval model 160 parsing an input query (which may be a question received by a digital assistant) and searching the meta tags of the articles in the knowledge base 150 based on the parsing to identify relevant articles and sort articles based on relevance. The content retrieval model 160 may retrieve the most relevant content identified in the knowledge base (such as the most relevant article).

As noted above, the content retrieval model 160 searches for, identifies, and retrieves content from the knowledge base 150 based on a query input to the content retrieval model 160. In the system 100, the question to be provided to the generative AI model 140 may be provided to the content retrieval model 160 as a query input. For example, the question received by a digital assistant from a user may be provided to the content retrieval model 160 as a query input. In this manner, the content retrieval model 160 attempts to identify and retrieve the most relevant content in the knowledge base 150 for the question.

Referring back to the generative AI model 140, in some implementations, the retrieved content from the content retrieval model 160 for a question may be provided to the generative AI model 140 in addition to the question as context for the generative AI model 140 to answer the question. To note, many generative AI models allow the input of knowledge that may be used by the model to shape its answer to an input question. Providing the content (such as an article) to the generative AI model 140 may include providing a link to an article in the knowledge base (or another accessible location by the generative AI model 140) via an API of the generative AI model 140 or providing the text of the article directly to the generative AI model 140 via an application programming interface (API) of the model. The article may affect tokenization of the question performed by the generative AI model 140 or the portions of the knowledge base content to leverage by the generative AI model 140 to answer the question.

The confidence metric generator 180 is to generate a confidence metric for an answer from the generative AI model 140. The manager 190 is to manage the generative AI model 140 based on the confidence metric. In some implementations, the manager 190 may manage the outputs of the generative AI model 140. For example, the manager 190 may prevent an answer from being provided to the user if the confidence metric indicates that the answer is not desirable for output. The answer may be undesirable if the answer includes, e.g., hallucinations or sensitive language (such as profanity). Additionally or alternatively to managing the outputs of the generative AI model 140, the manager 190 may manage training (such as fine-tuning) of the generative AI model 140. For example, the manager 190 may be a tuning engine to fine-tune the model 140. The confidence metric indicating that the answer is undesirable may be incorporated into a loss function by the manager 190, which may impact the adjustment of the hyperparameters of the model 140 during training, the number of iterations of adjustments to be performed for training, or the reliability of the model 140 after training. The confidence metric may also be used by the manager 190 to adjust the knowledge base 150 (such as to remove articles that consistently cause undesirable answers) or to adjust a training data set used to train the model 140 (such as to remove training questions from the training data set that include sensitive language).

Referring back to the confidence metric generator 180, the confidence metric is based on one or more similarity metrics generated by the NLP model 170. The confidence metric may also be based on one or more sensitivity indications generated by the sensitivity model 175. In some implementations, the confidence metric generator 180 compares the similarity metrics to similarity thresholds to generate similarity indications and combines the similarity indications to generate the confidence metric. The confidence generator 180 may also combine the sensitivity indications with the similarity indications to generate the confidence metric. Generation of the confidence metric is described in more detail below and also with reference to FIGS. 2 and 4.

The NLP model 170 is to generate the one or more similarity metrics to be used in generating the confidence metric by the confidence metric generator 180. For each answer from the generative AI model 140, the one or more similarity metrics generated by the NLP model 170 are based on: the question provided to the generative AI model 140; the answer generated by the generative AI model 140; and content retrieved by the content retrieval model 160 based on the question (which may be provided to the generative AI model 140 with the question in order for the generative AI model 140 to generate the answer). For example, a question from a user, the article retrieved by the content retrieval model 160 with an input query of the question, and the answer generated by the generative AI model 140 with the input of the question and the article are provided to the NLP model 170 to generate one or more metrics.

As noted above, typical evaluation of an answer from a generative AI model to determine if an answer is an accurate response to the question typically includes comparing the answer directly to the question. However, such comparison between answer and question typically requires manual evaluation by a user, who may have limited subject matter expertise (such as the user asking for help via a digital assistant in the first place). In comparison to typical means of evaluating the answer, the NLP model 170 is able to automatically generate the similarity metrics, which may indicate an accuracy of the answer.

To evaluate the answer, instead of comparing the answer directly to the question, the NLP model 170 compares the question to the content retrieved by the content retrieval model 160 to generate a first similarity metric. The NLP model 170 also compares the answer to the retrieved content to generate a second similarity metric. In some implementations, the NLP model 170 includes one or more large language models (LLMs) configured to determine a similarity between: (i) the text of the question and the text of the content and (ii) the text of the answer and the text of the content. For example, a first LLM of the NLP model 170 may receive the question as a first text string and receive the retrieved content as a second text string. The first LLM may tokenize the first text string to generate a first token string and vectorize the first token string to generate a first vector. The first LLM may also tokenize the second text string to generate a second token string and vectorize the second token string to generate a second vector. The NLP model 170 may then calculate a distance between the first vector and the second vector as a first similarity metric between the question and the retrieved content. Similarly, a second LLM of the NLP model 170 may receive the answer as a first text string and receive the retrieved content as a second text string. The second LLM may tokenize the first text string to generate a first token string and vectorize the first token string to generate a first vector. The second LLM may also tokenize the second text string to generate a second token string and vectorize the second token string to generate a second vector. The NLP model 170 may then calculate a distance between the first vector and the second vector as a second similarity metric between the answer and the retrieved content.

In some implementations, the first LLM and the second LLM are different instances of the same LLM or different LLMs altogether. For example, the first LLM may be a first instance of a T5 model configured to compare text, and the second LLM may be second instance of the same T5 model. In another example, the first LLM may be a T5 model configured to compare text, and the second LLM may be a BART model configured to compare text. In some other implementations, the first LLM and the second LLM are the same model. For example, the system 100 may first provide the question (or the answer) and the content to generate a similarity metric. Then, the system 100 may provide the answer (or the question based on what was first provided to the LLM) and the content to generate another similarity metric.

As noted above, in addition to the similarity metrics, the confidence metric may also be based on one or more sensitivity indications. For example, while the similarity metrics may imply the relevance or accuracy of the answer for the question based on the content, the similarity metrics do not indicate whether the answer (or the question) includes sensitive information or language. Sensitive language may include profanity. Sensitive language may also include toxic language, such as hate speech, disparaging remarks, or other socially insensitive language. In some implementations, sensitive information may include confidential information, person identifiable information, or other information that is not to be divulged to others.

The sensitivity model 175 is to analyze the answer from the generative AI model 140 and generate a first sensitivity indication as to whether the answer includes sensitive language (and optionally sensitive information). The sensitivity model 175 may also analyze the question provided to the generative AI model 140 and generate a second sensitivity indication as to whether the question includes sensitive language (and optionally sensitive information). In some implementations, the first sensitivity indication and the second sensitivity indication are binary indications as to whether or not sensitive language is included in the answer or the question. To generate the binary indications, the sensitivity model 175 may be implemented in the Python programming language, and the sensitivity model 175 may implement one or more of the better_profanity library or the detoxify library in Python. As such, the sensitivity model 175 may apply one or more of the better_profanity library or the detoxify library to the answer to generate the first sensitivity indication and to the question to generate the second sensitivity indication. If both libraries are applied to a question or an answer, the decision output by applying each library (such as a yes or no indication generated by applying each library) may be logically ORd by the sensitivity model 175 to generate the final sensitivity indication for the question or the answer. In this manner, if the application of either library indicates that the question (or answer) includes sensitive language, the sensitivity indication generated for the question (or answer) indicates that it includes sensitive language.

If the sensitivity model 175 is to also analyze the answer or question for sensitive information, a sensitive keyword list may be used by the sensitivity model 175 to search for such words in the question or answer to determine whether the question or answer include sensitive information. For example, the term "confidential" or a number in the form of a social security number may be included in the keyword list to check for such types of terms in the question or the answer. If the question or answer is also searched for sensitive information, the results of the search may also be used in generating the first sensitivity indication and the second sensitivity indication (such as logically ORing the results of the applying the better_profanity library and the detoxify library and the result of searching using the sensitive keyword list.

Referring back to the confidence metric generator 180, the confidence metric generator 180 may generate the confidence metric based on the first similarity metric, the second similarity metric, the first sensitivity indication, and the second sensitivity indication. In some implementations, the confidence metric generator 180 may compare the first similarity metric, which may be a numerical value, to a first similarity threshold to generate a first similarity indication as to whether the question is similar to the content. The confidence metric generator 180 may also compare the second similarity metric to a second similarity threshold to generate a second similarity indication as to whether the answer is similar to the content. For example, if the first similarity metric and the second similarity metric are distances between vectors (as described above), the confidence metric generator 180 may compare the distance to a threshold to determine whether the question or answer is similar to the content. If a first distance (as a first similarity metric) is less than the threshold, the confidence metric generator 180 may generate a first similarity indication indicating that the question is similar to the content. If the first distance is greater than the threshold, the first similarity indication indicates that the question is not similar to the content (which may be a result of the knowledge base including sufficient content for the question or the content retrieval model identifying the incorrect content as most relevant). Similarly, if a second distance (as a second similarity metric) is less than the threshold, the confidence metric generator 180 may generate a second similarity indication indicating that the answer is similar to the content. If the second distance is greater than the threshold, the second similarity indication indicates that the answer is not similar to the content. To note, the first similarity indication and the second similarity indication may be binary indications (such as similar to the sensitivity indications described above). In some implementations, the same threshold may be compared to the first similarity metric and the second similarity metric. In some other implementations, different thresholds may be compared to the first similarity metric and the second similarity metric. For example, if the same LLM is used to generate the first similarity metric and the second similarity metric, the same threshold may be compared to the first similarity metric and the second similarity metric. If a different LLM is used to generate the first similarity metric and the second similarity metric, a different threshold may be compared to the first similarity metric and the second similarity metric. The threshold(s) may be defined in any suitable manner. For example, a threshold may be programmed by a developer based on previous evaluations and testing to determine a desired threshold. In some examples, the threshold may be adjustable, such as by a user.

The confidence metric generator 180 may thus combine the first similarity indication, the second similarity indication, the first sensitivity indication, and the second sensitivity indication to generate the confidence metric. In some implementations, the confidence metric is a binary indication as to whether the answer is a desirable response to the question (such as the answer being relevant and not including sensitive language). Combining the first similarity indication, the second similarity indication, the first sensitivity indication, and the second sensitivity indication may include logically ANDing the first similarity indication, the second similarity indication, the first sensitivity indication, and the second sensitivity indication. In this manner, if any of the indications indicate that either the question or the answer is not similar to the content or include sensitive language, the confidence metric indicates that the answer is not desirable.

To note, while logically ANDing all indications is described as one implementation of combining the indications, other ways to combine the indications may be used. In some implementations, the confidence metric generator 180 may be configured to select only a subset of metrics to logically AND. For example, a user may have an option to indicate whether or not sensitive language should be allowed. For a user interacting with a digital assistant, in the digital assistant, the user may be able to toggle an option to enable or disable sensitive language (similar to turning on and off a profanity filter). If sensitive language is allowed, the sensitivity indications may not be generated by the sensitivity model 175 or the sensitivity indications may be disregarded by the confidence metric generator 180. As such, confidence metric generator 180 may combine only the first similarity indication and the second similarity indication to generate the confidence metric (such as logically ANDing the two indications to generate an indication as to whether both the question and the answer are similar to the retrieved content).

While the generative AI model 140, the knowledge base 150, the content retrieval model 160, the NLP model 170, the sensitivity model 175, the confidence metric generator 180, and the manager 190 are depicted as separate components of the system 100 in FIG. 1 for clarity, the components 140-190 may be included in software including instructions stored in memory 135 or the database 120. In addition, components of the system 100 may be included in one device, distributed across multiple devices, may be included in fewer components, and so on. If the components are software, the components may be implemented using any suitable computer-readable language. For example, the generative AI model 140, the content retrieval model 160, the NLP model 170, the sensitivity model 175, the confidence metric generator 180, or the manager 190, and the configuration and interoperability of such components, may be programmed in the Python programming language using any suitable libraries.

As noted above, the content is retrieved by the content retrieval model based on the question. As such, comparing the question and the content (which depends on the question), comparing the answer and the content (with the answer depending on the question and the content), and generating the confidence metric based on both comparisons indirectly determines whether the answer is relevant to the question. The addition of the sensitivity indications to generate the confidence metric can ensure that the confidence metric indicates that the answer (and the question) also do not include sensitive language as well as the answer being relevant to the question.

Figure 2:
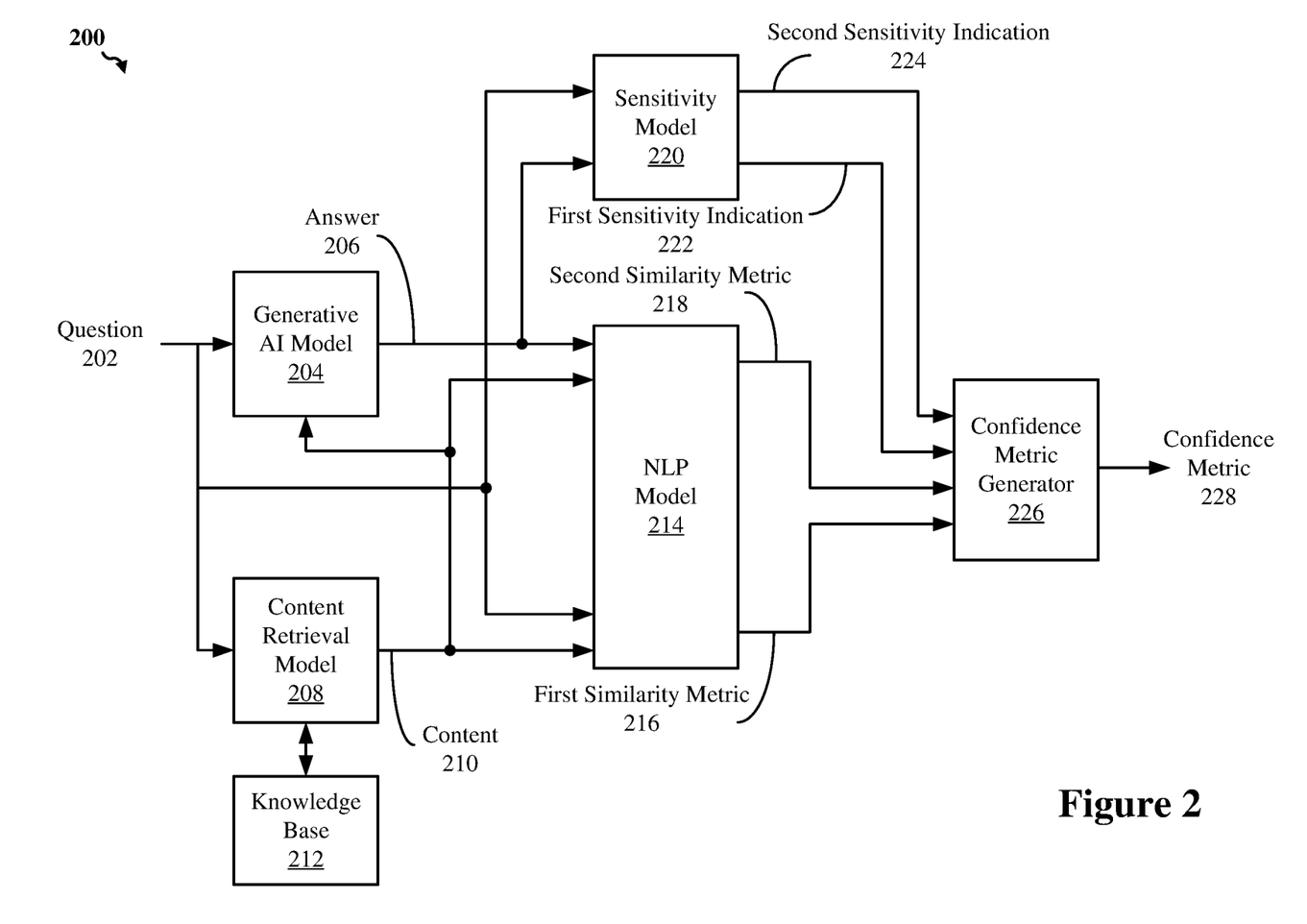
FIG. 2 shows an example block diagram for generating a confidence metric, according to some implementations.

FIG. 2 shows an example block diagram 200 for generating a confidence metric, according to some implementations. The block diagram 200 depicts an example arrangement of components 140-180 of system 100 depicted in FIG. 1. As such, the generative AI model 204 is an example implementation of the generative AI model 140, the knowledge base 212 is an example implementation of the knowledge base 150, the content retrieval model 208 is an example implementation of the content retrieval model 160, the NLP model 214 is an example implementation of the NLP model 170, the sensitivity model 220 is an example implementation of the sensitivity model 175, and the confidence metric generator 226 is an example implementation of the confidence metric generator 180.

As depicted, the generative AI model 204 receives the question 202 and the content 210 to generate the answer 206. The content retrieval model 208 receives the question 202 to retrieve the content 210 from the knowledge base 212. The NLP model 214 receives the question 202 and the content 210 and generates the first similarity metric 216. The NLP model 214 also receives the answer 206 and the content 210 and generates the second similarity metric 218. The sensitivity model 220 receives the answer 206 and generates the first sensitivity indication 222. The sensitivity model 220 also receives the question 202 and generates the second sensitivity indication 224. The confidence metric generator 226 receives the first similarity metric 216, the second similarity metric 218, the first sensitivity indication 222, and the second sensitivity indication 224. The confidence metric generator 226 receives the first similarity metric 216, the second similarity metric 218, the first sensitivity indication 222, and the second sensitivity indication 224 and generates the confidence metric 228 from the first similarity metric 216, the second similarity metric 218, the first sensitivity indication 222, and the second sensitivity indication 224. Generation of the confidence metric may be performed as described above and is also described below with reference to FIG. 4, with the confidence metric used to manage the generative AI model.

Figure 3:
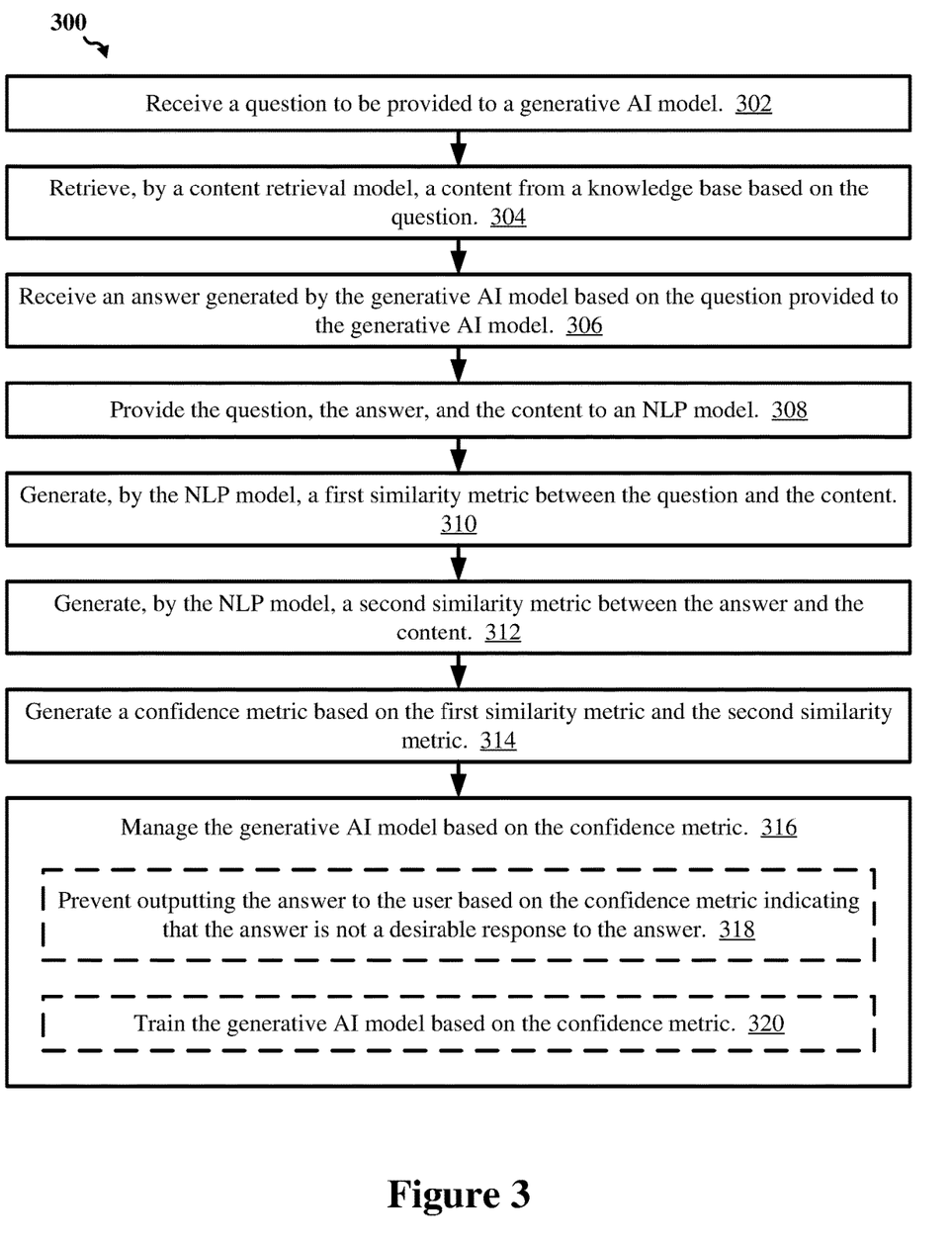
FIG. 3 shows an illustrative flow chart depicting an example operation of managing a generative AI model, according to some implementations.

FIG. 3 shows an illustrative flow chart depicting an example operation 300 of managing a generative AI model, according to some implementations. The operation 300 is described as being performed by the system 100 with reference to the configuration of components depicted in FIG. 2 for clarity in explaining aspects of the present disclosure.

At 302, the system 100 receives a question to be provided to a generative AI model 140. For example, the system 100 may receive a question from a user interacting with an AI chatbot style digital assistant via the interface 110. At 304, the content retrieval model 160 retrieves a content from the knowledge base 150 based on the question. For example, referring to FIG. 2, the content retrieval model 208 receives the question 202 as an input query to search the knowledge base 212. The content retrieval model 208 may search the knowledge base to identify the content 210 most relevant to the question (such as the most relevant article) and retrieve the content 210 from the knowledge base 212.

At 306, the system 100 receives an answer generated by the generative AI model 140 based on the question provided to the generative AI model 140. For example, referring to FIG. 2, the question 202 is provided as an input to the generative AI model 204, and the generative AI model 204 generates the answer 206. While not depicted in FIG. 3, in some implementations, the generative AI model 204 may also receive the content 210 retrieved by the content retrieval model 208 in block 304 as an input (such as to provide context for generating the answer 206 based on the question 202). As such, in some implementations, the answer 206 is based on the question 202 and the content 210.

At 308, the system 100 provides the question, the answer, and the content to the NLP model 170. At 310, the NLP model 170 generates a first similarity metric between the question and the content. At 312, the NLP model 170 generates a second similarity metric between the answer and the content. Generating the first similarity metric and the second similarity metric may be performed as described above with reference to the NLP model 170.

At 314, the system 100 (such as the confidence metric generator 180) generates a confidence metric based on the first similarity metric and the second similarity metric. For example, the confidence metric generator 180 may determine whether both similarity metrics meet a threshold to indicate that both the question and the answer are similar to the content. If both similarity metrics meet a threshold, the confidence metric may be an indication that the answer is relevant to the question. While not depicted in FIG. 3, in some implementations, generating the confidence metric may also be based on one or more sensitivity indications, such as described below with reference to FIG. 4.

Figure 4:
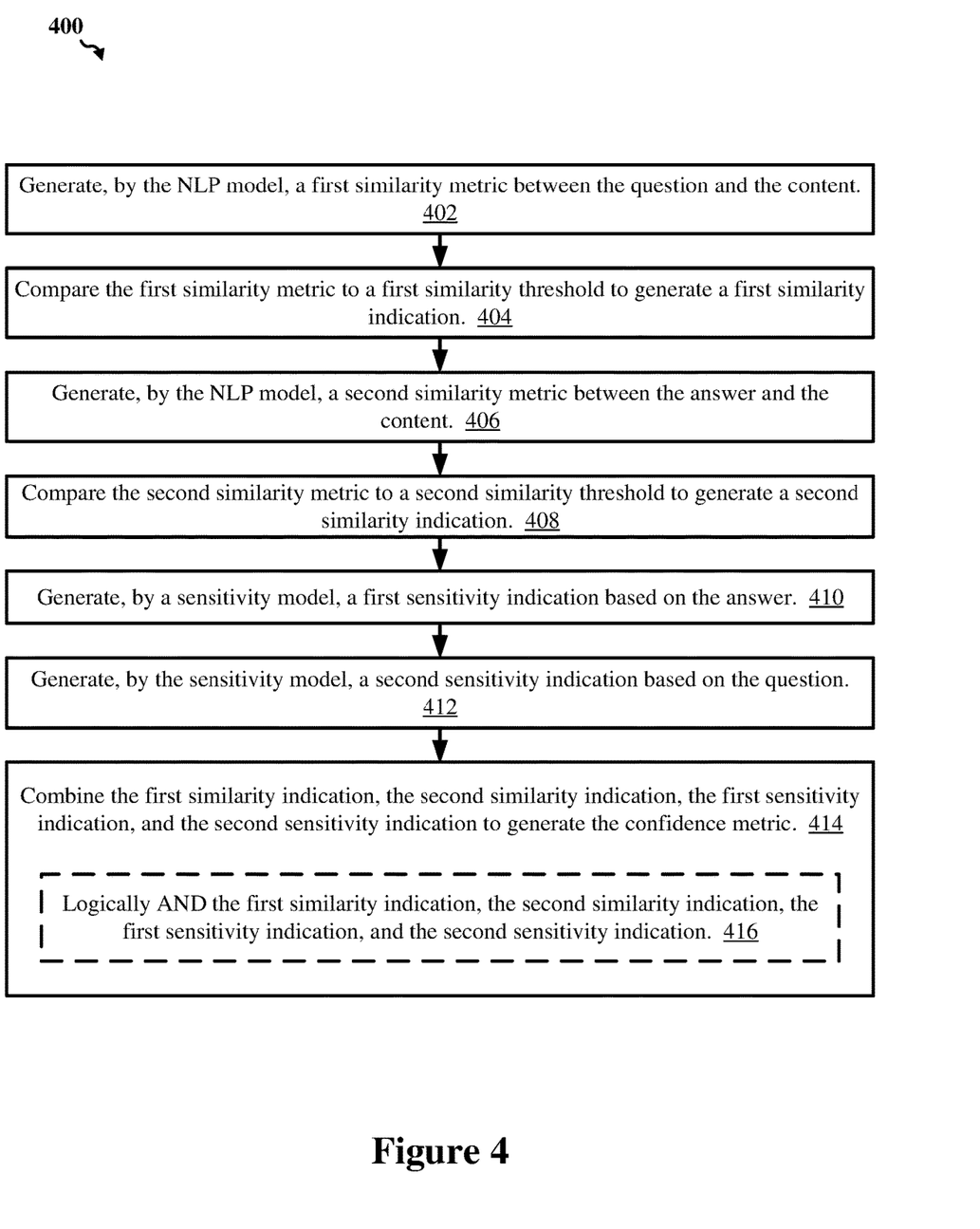
FIG. 4 shows an illustrative flow chart depicting an example operation of generating a confidence metric, according to some implementations.

FIG. 4 shows an illustrative flow chart depicting an example operation 400 of generating a confidence metric, according to some implementations. Operation 400 is described herein as being performed by the system 100 depicted in FIG. 1 including the configuration of components depicted in FIG. 2 for clarity in describing aspects of the present disclosure.

At 402, the NLP model 214 generates a first similarity metric between the question and the content. Block 402 is the same as block 310 depicted in FIG. 3. For example, the NLP model 214 may receive the question 202 as a first text string, tokenize the first text string to generate a first token string, and vectorize the first token string to generate a first vector. The NLP model 214 may also receive the content 210 as a second text string, tokenize the second text string to generate a second token string, and vectorize the second token string to generate a second vector. The NLP model 214 may then calculate a distance between the first vector and the second vector as a similarity between the question 202 and the content 210. At 404, the system 100 (such as the confidence metric generator 226) compares the first similarity metric to a first similarity threshold to generate a first similarity indication.

At 406, the NLP model 214 generates a second similarity metric between the answer and the content. Block 406 is the same as block 312 depicted in FIG. 3. For example, the NLP model 214 may generate a vector from the answer 206 similar as described above with reference to the question 202, and the NLP model 214 may calculate a distance between the vector generated from the answer 206 and the vector generated from the content 210, with the distance being the second similarity metric 218. At 408, the system 100 (such as the confidence metric generator 226) compares the second similarity metric to a second similarity threshold to generate a second similarity indication. As noted above, the first similarity metric may be the same as or different than the second similarity metric.

At 410, the sensitivity model 220 generates a first sensitivity indication based on the answer. At 412, the sensitivity model 220 generates a second sensitivity indication based on the question. For example, the sensitivity model 220 may include the better_profanity library and the detoxify library implemented using Python. Generating the first sensitivity indication 222 may include applying the better_profanity library and the detoxify library to the answer 206 to detect profanity or toxic language in the answer 206, with the first sensitivity indication indicating whether the answer 206 includes profanity or toxic language. Generating the second sensitivity indication 224 may include applying the better_profanity library and the detoxify library to the question 202 to detect profanity or toxic language in the question 202, with the second sensitivity indication indicating whether the question 202 includes profanity or toxic language.

At 414, the system 100 (such as the confidence metric generator 226) combines the first similarity indication, the second similarity indication, the first sensitivity indication, and the second sensitivity indication to generate the confidence metric. In some implementations, the system 100 (such as the confidence metric generator 226) logically ANDs the first similarity indication, the second similarity indication, the first sensitivity indication, and the second sensitivity indication (416).

While logically ANDing the four indications is described as one example implementation of generating the confidence metric, the confidence metric may be generated in other ways. For example, the confidence metric may be a bit vector of the four indications. In this manner, the confidence metric provides additional fidelity as to whether sensitive language causes or whether the answer or question being dissimilar to the content causes the answer to be undesirable. In another example, the four indications may be numerical values instead of binary indications (such as a value from 0 to 1) to indicate, e.g., a degree of similarity or a degree of confidence in that profanity is included. In such an example, the confidence metric may be an average, a summation, or a vector of the values, with management of the generative AI model 140 being based on such a confidence metric.

Referring back to FIG. 3, with the confidence metric generated, the system 100 (such as the manager 190) manages the generative AI model based on the confidence metric (316). The confidence metric may be an indication as to whether the answer is a desirable response to the question. For example, the confidence metric may indicate whether the answer is not relevant to the question or whether the question or answer include sensitive language such that the answer may be undesirable. In some implementations, if the generative AI model 140 is in use by a user (such as by an end user with the generative AI model 140 having been previously fine-tuned and released for use), managing the generative AI model 140 by the manager 190 based on the confidence metric includes preventing outputting the answer to the user based on the confidence metric indicating that the answer is not the desirable response to the answer (318). For example, if the answer is determined to not be similar to the content, the second similarity metric may cause the confidence metric to indicate that the answer is undesirable. In another example, if the question is determined to include sensitive language, the second sensitivity indication may cause the confidence metric to indicate that the answer is undesirable. As such, the manager 190 may prevent, e.g., a digital assistant that receives the question from the user, from outputting the answer to the user based on the confidence metric indicating that the answer is not a desirable response.

In some other implementations, if the generative AI model 140 is to be trained or is in training (such as being fine-tuned using the knowledge base 150), managing the generative AI model 140 by the manager 190 may include training the generative AI model based on the confidence metric (320). For example, the generative AI model 140 is to be trained using a training set. The training set includes a plurality of data points, with each data point including a question answer pair and, in some implementations, content retrieved from the knowledge base 150 as relevant to the question. Training the generative AI model 140 may include performing iterations of: providing questions to the generative AI model 140 to generate answers (with the content of the training set optionally being provided to the generative AI model 140 to provide context for generating the answers); comparing the answers from the generative AI model to the answers from the training set (such as determining a distance between corresponding answers), and adjusting hyperparameters of the generative AI model 140 based on the comparison. Training may continue until the similarity between corresponding answers reaches a desired threshold or the answers do not become further similar to the training set answers over iterations (such as based on the Adam optimization algorithm and a loss function based on the similarity comparison between answers for training machine learning models).

In some implementations, the question received in block 302 may be included in the training set used to train the generative AI model 140. As such, the confidence metric may be considered feedback for the training. The confidence metric may thus be used as an input in a feedback loop in the training of the generative AI model. For example, even if an answer generated by the generative AI model 140 is similar to the training set answer, the confidence metric may indicate that the generated answer is not similar to the retrieved content. In this manner, the answers being similar may be a coincidence that might not be repeated in another iteration of generating an answer by the generative AI model 140 and comparing the answers. As such, the confidence metric associated with a training set question may increase or decrease a weight in the loss function associated with the answer similarity for the question to impact the loss. For example, the loss function may be a weighted average of a distance between a generated answer and a training set answer across the questions in the training set. If a question is associated with a confidence metric indicating that the generated answer is not similar to the content, the weight for the distance associated with that question may be adjusted so that the effect of that distance on the average of distances for the loss is adjusted.

In some other implementations, if the confidence metric indicates that the question includes sensitive language (such as the confidence metric being the second sensitivity indication and the second sensitivity indication indicating that the question includes profanity), the confidence metric may be used as feedback to adjust the training set in training the generative AI model 140. For example, the data point including the question may be removed from the training set. To note, the training set may be included in any suitable storage, such as the database 120. As such, the system 100 may delete the data point entry from the training set in the database 120 if the question includes sensitive language. In another example, the confidence metric may repeatedly indicate that retrieved content is not similar to the question. For example, the knowledge base 150 may not include an article sufficient for answering the question in the training set. The system 100 may use the confidence metric as feedback to delete the training set data point including the question so that the generative AI model 140 is not attempted to be trained using such question. In this manner, the confidence metric may be used as additional feedback to improve training (such as fine-tuning) of the generative AI model 140.

As described herein, a system may be implemented to manage a generative AI model, which may include managing the outputs of the generative AI model or managing training of the generative AI model. As such, outputs provided to a user may be improved to improve a user experience with a generative AI model (such as to prevent hallucinations and sensitive language from being provided to the user in the answers). Additionally or alternatively, the generative AI model may be improved (such as through training) to improve a user experience with the model.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for managing a generative artificial intelligence (AI) model, the method comprising:
   receiving a question to be provided to a generative AI model;
   retrieving, by a content retrieval model, a content from a knowledge base based on the question;
   receiving an answer generated by the generative AI model based on the question provided to the generative AI model;
   providing the question, the answer, and the content to a natural language processing (NLP) model;
   generating, by the NLP model, a first similarity metric between the question and the content;
   generating, by the NLP model, a second similarity metric between the answer and the content;
   generating a confidence metric based on the first similarity metric and the second similarity metric, wherein the confidence metric is an indication as to whether the answer is a desirable response to the question; and
   managing the generative AI model based on the confidence metric, wherein managing the generative AI model based on the confidence metric includes:
   training the generative AI model using a training set, wherein:
   the question is included in the training set; and
   the confidence metric is used as an input in a feedback loop in the training of the generative AI model;
   using the trained generative AI model to generate a second answer based on a second question provided by a user to the trained generative AI model, wherein the trained generative AI model is in use by the user; and
   preventing outputting the second answer to the user based on a confidence metric indicating that the second answer is not the desirable response to the second question.

2. The method of claim 1, further comprising:
   providing the answer to a sensitivity model; and
   generating, by the sensitivity model, a first sensitivity indication based on the answer, wherein generating the confidence metric is based on the first sensitivity indication.

3. The method of claim 2, further comprising:
   providing the question to the sensitivity model; and
   generating, by the sensitivity model, a second sensitivity indication based on the question, wherein generating the confidence metric is based on the second sensitivity indication.

4. The method of claim 3, wherein:
   the sensitivity model includes:
   a better_profanity library implemented using a Python programming language; and
   a detoxify library implemented using a Python programming language;

generating the first sensitivity indication includes applying the better_profanity library and the detoxify library to the answer to detect profanity or toxic language in the answer; and generating the second sensitivity indication includes applying the better_profanity library and the detoxify library to the question to detect profanity or toxic language in the question.

5. The method of claim 3, wherein generating the confidence metric includes:

comparing the first similarity metric to a first similarity threshold to generate a first similarity indication;

comparing the second similarity metric to a second similarity threshold to generate a second similarity indication; and combining the first similarity indication, the second similarity indication, the first sensitivity indication, and the second sensitivity indication to generate the confidence metric.

6. The method of claim 5, wherein combining the first similarity indication, the second similarity indication, the first sensitivity indication, and the second sensitivity indication includes logically ANDing the first similarity indication, the second similarity indication, the first sensitivity indication, and the second sensitivity indication.

7. A system for managing a generative artificial intelligence (AI) model, the system comprising:

a knowledge base to store content;

one or more processors; and a memory storing instructions that, when executed by the one or more processors, causes the system to perform operations comprising:

receiving a question to be provided to a generative AI model;

retrieving, by a content retrieval model, a content from the knowledge base based on the question;

receiving an answer generated by the generative AI model based on the question provided to the generative AI model;

providing the question, the answer, and the content to a natural language processing (NLP) model;

generating, by the NLP model, a first similarity metric between the question and the content;

generating, by the NLP model, a second similarity metric between the answer and the content;

generating a confidence metric based on the first similarity metric and the second similarity metric, wherein the confidence metric is an indication as to whether the answer is a desirable response to the question; and managing the generative AI model based on the confidence metric, wherein managing the generative AI model based on the confidence metric includes:

training the generative AI model using a training set, wherein:

the question is included in the training set; and the confidence metric is used as an input in a feedback loop in the training of the generative AI model;

using the trained generative AI model to generate a second answer based on a second question provided by a user to the trained generative AI model, wherein the trained generative AI model is in use by the user; and preventing outputting the second answer to the user based on a confidence metric indicating that the second answer is not the desirable response to the second question.

8. The system of claim 7, wherein the operations further comprise:

providing the answer to a sensitivity model; and generating, by the sensitivity model, a first sensitivity indication based on the answer, wherein generating the confidence metric is based on the first sensitivity indication.

9. The system of claim 8, wherein the operations further comprise:

providing the question to the sensitivity model; and generating, by the sensitivity model, a second sensitivity indication based on the question, wherein generating the confidence metric is based on the second sensitivity indication.

10. The system of claim 9, wherein:

the sensitivity model includes:

a better_profanity library implemented using a Python programming language; and a detoxify library implemented using a Python programming language;

generating the first sensitivity indication includes applying the better_profanity library and the detoxify library to the answer to detect profanity or toxic language in the answer; and generating the second sensitivity indication includes applying the better_profanity library and the detoxify library to the question to detect profanity or toxic language in the question.

11. The system of claim 9, wherein generating the confidence metric includes:

comparing the first similarity metric to a first similarity threshold to generate a first similarity indication;

comparing the second similarity metric to a second similarity threshold to generate a second similarity indication; and combining the first similarity indication, the second similarity indication, the first sensitivity indication, and the second sensitivity indication to generate the confidence metric.

12. The system of claim 11, wherein combining the first similarity indication, the second similarity indication, the first sensitivity indication, and the second sensitivity indication includes logically ANDing the first similarity indication, the second similarity indication, the first sensitivity indication, and the second sensitivity indication.

\* \* \* \* \*